United States Patent

Blackburn et al.

[11] 4,142,017
[45] Feb. 27, 1979

[54] FLEXIBLE LAMINATES AND PROCESSES FOR PRODUCING SAME

[75] Inventors: William A. Blackburn, Chapel Hill; Roy D. Goodwin, Raleigh, both of N.C.

[73] Assignee: Monsanto Company, St. Louis, Mo.

[21] Appl. No.: 864,423

[22] Filed: Dec. 27, 1977

[51] Int. Cl.$^2$ .............................................. B32B 7/00
[52] U.S. Cl. ................................... 428/284; 156/309; 427/412; 428/247; 428/248; 428/249; 428/253; 428/286; 428/298; 428/302; 428/391; 428/913
[58] Field of Search ............... 428/110, 109, 113, 138, 428/198, 238, 239, 247, 249, 255, 286, 287, 284, 297, 298, 302, 246, 265, 266, 267, 248, 913, 391; 427/407 B, 412; 156/309

[56] References Cited

U.S. PATENT DOCUMENTS

| 2,902,395 | 9/1959 | Hirchey et al. | 428/249 |
| 3,629,047 | 12/1971 | Davidson | 156/291 |
| 3,770,562 | 11/1973 | Newman | 428/297 |
| 3,862,877 | 1/1975 | Camden | 156/179 |

*Primary Examiner*—James J. Bell
*Attorney, Agent, or Firm*—Thomas N. Wallin; Donald J. Fitzpatrick

[57] ABSTRACT

A flexible laminate having a high tear strength comprising an adhesive impregnated open mesh reinforcing web with upper and lower surfaces of lightly bonded fibers, a finish applied to the fiber surfaces, wherein at least one outer layer is adhesively bonded to at least one surface of the web. The fibers in the web are surrounded by adhesive, however the adhesive is prevented from contacting the fibers by the finish, thus allowing the fibers to remain substantially unbonded to the outer layer, thereby permitting substantial freedom of fiber movement within the laminate.

36 Claims, 1 Drawing Figure

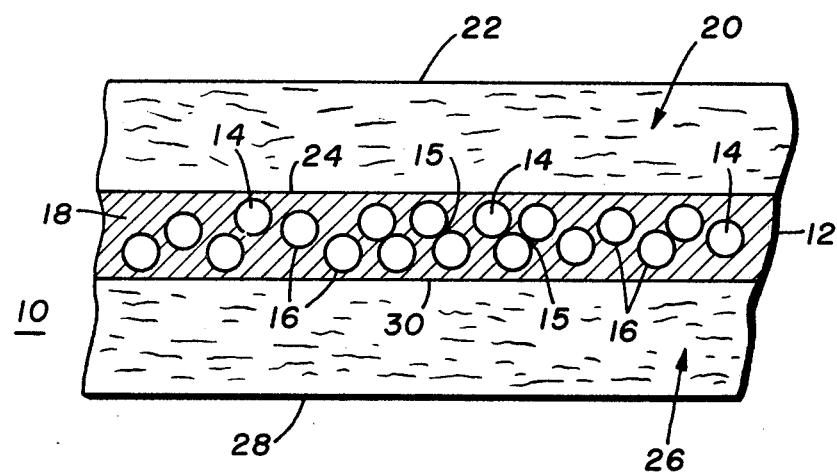

FLEXIBLE LAMINATES AND PROCESSES FOR PRODUCING SAME

BACKGROUND OF THE INVENTION

1. Field of the Invention

This invention relates to flexible laminates and to a process for their production and more specifically to tissue laminates reinforced with a web having fibers treated with a finish so that the tissue laminates have excellent levels of tear strength.

2. Description of the Prior Art

Flexible laminates of fiber layers are well known in the art. These products generally comprise reinforcing webs and layers of various fibers. The reinforcing web can be used as a centrally disposed layer with adhering outer fiber layers or a pair of reinforcing webs can be used to sandwich a centrally disposed fiber layer. A typical laminate of the prior art is described in U.S. Pat. No. 3,388,028 issued to Robert R. Alexander on June 11, 1968. The laminate described in this patent comprises a layer of cellulose fibers plied between a pair of reinforcing webs.

A specific class of flexible laminates are known as tissue laminates. These products comprise a central reinforcing web and outer tissue layers. Tissue laminates are drapable, strong and absorbent and have gained widespread use as disposable clothing, toweling, and surgical drapes.

The laminates of the prior art have generally been prepared by impregnating a central reinforcing web having an open mesh with an adhesive and then placing tissue layers on the upper and lower surfaces of the web. The tissue layers become bonded to the reinforcing web and to one another through the openings in the web. These tissue laminates are intended to be used as inexpensive substitutes for conventionally woven cloth fabrics. It is a goal of those skilled in the art to achieve cloth-like properties which are characteristic of woven fabrics such as drape, strength and absorbency while at the same time supplying a cost saving substitute.

Laminate strength is generally attributed to the central reinforcing web. This web can be knitted, woven or nonwoven. If a nonwoven web is used it may be formed by spunbonding, fiber entanglement or needle punching. The fibers used in reinforcing webs may be composed of a natural or synthetic substance such as cotton, wool, polyamide, polyester or blends of such substances. The particular fiber selected for reinforcement and the construction of the web are significant factors in the over-all strength properties of the laminate. In addition to strength a laminate is also characterized by aesthetics, i.e., drape, softness and absorbency. These properties are generally attributed to the characteristics of the tissue layers, and the type and quantity of adhesive used for bonding the layers in the laminate.

Tissue laminates having adequate strength and offering cloth-like properties have been produced with varying degrees of success. Some laminates have been successfully substituted for conventional woven fabrics. Prior workers have modified laminate properties by varying the type and quantity of adhesive, the construction of the reinforcing web and/or the type of tissue layer. To achieve the best combination of properties, i.e., strength without a sacrifice in laminate aesthetics namely drape and softness, adhesive concentration must be carefully controlled. A soft and drapable product can be attained with lesser amounts of adhesive but delamination of the individual layers will generally occur. On the other hand, a higher concentration of adhesive will prevent delamination but there will be a sacrifice in laminate aesthetics.

U.S. Pat. No. 3,629,047, issued to Robert W. Davison on Dec. 21, 1971, recognized that the strength of laminates and particularly tear strength can be enhanced by preventing or minimizing the adherence of the central reinforcing web to the outer layers. This patent discloses that when an external force of sufficient strength is applied to a laminate a tear will occur. This tear will continue unabated throughout the laminate if the individual fibers in the reinforcing web are restrained and prevented from moving about in order to relocate and redistribute the applied stress. Failure of the laminate occurs because the individual fibers fail one at a time. Therefore the only force required to initiate a tear is that needed to break a single fiber. The patentee goes on to disclose that if the individual fibers in the reinforcing web have freedom of movement they can bunch up and reinforce one another at the tear point and thus offer resistance to the continued propagation of the tear. Thus, laminates should be assembled in such a manner that the fibers in the reinforcing web have freedom of movement. This patent discloses that the fibers in the web should be unbonded or only lightly bonded to one another. Secondly when the laminate is formed the fibers in the web should not adhere to the outer layers. The patentee states this can be accomplished by using an adhesive that will adhere to the fibers of the outer layers but not to the fibers of the reinforcing web.

U.S. Pat. No. 3,862,877, issued to James B. Camden on Jan. 28, 1975, discloses a cloth-like tissue laminate having improved drape. This patent discloses a variety of materials suitable for a reinforcing web. The patentee desires that the fibers of the reinforcing web be free to move against one another at their crossover points. The patentee states this can be accomplished when, "the tissue face layer on the reinforcement side of the laminate is combined with the central impregnated tissue layer in a pocket bonding fashion to surround, but not bond, the strands of the scrim reinforcement to the facing tissue layer." (Col. 1, lines 26–30). By the term "pocket bonding" the patentee is believed to mean the web fibers are enveloped, but not bonded to, the outer tissue layers. It is the patentees belief that the reinforcing fibers are thus assured freedom of movement by virtue of pocket bonding and a laminate having improved properties is thereby obtained.

In general workers in the field have recognized that laminates, especially tissue laminates, having adequate strength and capable of resisting tear would be commercially attractive as alternative materials for conventionally woven and/or knitted fabrics. It has been found that laminates having the property of resistance to tear can be obtained by using a reinforcing web having strong individual fibers capable of substantially unrestricted movement when the laminate is stressed.

Although Davison and Camden recognized that the fibers constituting the reinforcing web must have substantial freedom of movement the accomplishment of such a result has proven to be elusive in the actual fabrication of flexible laminates and particularly tissue laminates. Many well known adhesives such as water-insoluble polymer dispersions have caused adhesion to take place between the fibers of reinforcing webs and the outer tissue layers. This has resulted in restricting fiber movement within the laminate with a resultant decrease in laminate strength properties, particularly tear strength.

SUMMARY OF THE INVENTION

The laminate of this invention comprises an adhesive impregnated open mesh reinforcing web, having upper and lower surfaces, comprising essentially all lightly bonded fibers; a finish applied to the fiber surfaces; wherein at least one outer layer of fibers is adhesively bonded to at least one surface of the web. The fibers in the reinforcing web have freedom of movement because they are lightly bonded at points of fiber intersection and the lack of adhesion between these fibers and the outer layer as a result of the finish. When the reinforcing web is impregnated with adhesive the adhesive fills the open mesh between the fibers and surrounds them. The adhesive is prevented from contacting the fibers by the finish and any adhesion between the fibers and the outer layer is effectively prevented. Tissue laminates of this invention can be soft, drapable and characterized by a high tear strength.

It is therefore an object of this invention to provide a laminate that has the cloth-like characteristics of drape, softness, absorbency and a high tear strength.

It is another object of this invention to provide a tissue laminate having a reinforcing web comprising fibers having substantially freedom of movement when the laminate is stressed.

A still further object of this invention is to provide a process for producing a laminate having drape, softness, absorbency and a high tear strength.

These and other objects will become apparent from the description of the invention as hereinafter more fully described.

BRIEF DESCRIPTION OF THE DRAWING

The FIGURE is an enlarged cross-sectional view illustrating an embodiment of the laminate of this invention.

DETAILED DESCRIPTION OF THE PREFERRED EMBODIMENTS

The flexible laminates of this invention comprise an open mesh reinforcing web with upper and lower surfaces comprising lightly bonded or unbonded fibers and having at least one outer layer of soft bulky fibers adhesively bonded to at least one surface of the web with a more preferred embodiment having layers of soft bulky fibers adhesively bonded to both upper and lower surfaces of the web. A finish is applied to the surfaces of the fibers in the reinforcing web. The web is impregnated with an adhesive so that the surfaces of the layers adjacent to the web surfaces will adhere to the surfaces of the adhesively impregnated web. The finish effectively prevents adhesion between the fibers of the reinforcing web and the layers of soft, bulky fibers. Thus the fibers of the web are free to move within the laminate when the laminate is stressed. Freedom of fiber movement is an essential feature of this invention and provides a laminate with a high tear strength.

The fibers suitable for use in the reinforcing web of the laminate of this invention may be composed of a natural or synthetic substance such as cotton, wool, silk, cellulosics, polyamide, polyester, acrylic, modacrylic, polyolefin, rayon, or a blend of two or more of such substances. As used herein the term "fiber" is generic, and is meant to define elongated textile raw materials. Fibers have a length which is many times as great as their diameter. Fibers may be short sections such as rayon staple or long sections of indefinite length such as continuous filaments of polyester or polyamide. This invention is applicable to fibers of staple and continuous length and various blends of such fibers. For purposes of this description the terms "filament" and "fiber" are equivalent and can be used interchangeably. If staple fibers are used they usually range in length from 0.16 cm to 6.35 cm. Generally speaking the staple fibers range in length from about 0.32 cm to about 3.18 cm. In some of the highest strength laminates contemplated by this invention the fibers used for the reinforcing web consist essentially of low denier continuous filaments.

The open mesh reinforcing web used in the flexible laminate of this invention may be knitted, woven or nonwoven. If a nonwoven web is used it may be formed by spunbonding as described in U.S. Pat. No. 3,542,615, or by fiber entanglement as described in U.S. Pat. Nos. 3,485,709, 3,485,708 and 3,485,706, or by needle punching as described in U.S. Pat. No. 3,583,651. A particular preferred embodiment utilizes a nonwoven web of synthetic organic continuous filaments, e.g., a spun bonded nonwoven web which may be prepared in a manner described in U.S. Pat. No. 3,542,615, the disclosure of which is herein incorporated by reference. This patent discloses the production of a self-bonded, nonwoven web from a polymer melt in a single continuous operation. Continuous filaments are spun from a molten polyamide and pneumatically attenuated prior to deposition in a random pattern onto the surface of a conveyor belt to form a uniform, coherent web. After web formation the filaments are lightly bonded, forming spot bonds, at points of filament intersection. Spot bonds as contrasted to permanent bonds are bonds of relatively low strength and can easily be broken and disrupted by a mechanical treatment after laminate formation, whereas permanent bonds are stronger and can not be broken by such a treatment. Frequently, the fibers will break under stress before a permanent bond is broken or disrupted. A sufficient amount of bonding should be imparted to the web so as to provide strength to facilitate subsequent handling, that is, adequate strength to prevent the web from falling apart during further processing. Permanent bonds formed at points of fiber intersection must be essentially avoided in order for the individual fibers to have freedom of movement after the reinforcing web is incorporated into the tissue laminate as hereinafter more fully described.

The reinforcing web employed in this invention contains fibers in amounts broadly ranging from about 3 to about 150 g/m², preferably from about 6 to about 34 g/m² and more preferably from about 10 to about 25 g/m². It is obvious that more than one reinforcing web can be used in the laminates of this invention.

The finish used in the laminate of this invention is a substance that serves as a barrier between the adhesive and the fibers which form the reinforcing web. The finish should, cover the fiber surfaces with an essentially complete and impervious annular shell; maintain its integrity during processing of the laminate; and, not form permanent bonds at points of fiber intersection.

The finish encircles the fibers and forms a thin annular shell approximately from 0.015 microns to 0.24 microns essentially completely around each fiber thus serving to prevent adhesive penetration and contact with the fiber surfaces. Normally fiber surfaces have cracks, voids and other discontinuities that tend to pick up and fill in with adhesive. This causes some adhesion between the fibers and the adhesive resulting in a decrease in fiber movement. The finish serves to fill in these surface discontinuities thus further reducing any fiber-adhesive adhesion from taking place.

The finish should maintain its integrity during processing of the laminate, that is, be durable to withstand flexing and bending of the fibers without breaking the impervious annular shell. If the shell is cracked adhesive can seep in and contact the fiber surface thus causing adhesion. The finish should not be dissolved by any of the solvents used in the adhesive formulation. If dissolution of the finish occurs the adhesive may adhere to the fiber surface.

As herein discussed tear strength is increased by freedom of fiber movement within the laminate. It is therefore important that the finish not form permanent bonds at points of fiber intersection and thus restrict fiber movement.

The finish can be supplied to the fibers of the reinforcing web in the form of a film or as a liquid, particularly an emulsion, prior to formation of the web or after the web has been formed. If the finish is to be applied as a film this can be conducted after web formation. A polyolefin such as polyethylene film can be applied to the web. The web is hot pressed and the film melts and encircles the fibers. The web and film are sintered in order to improve the integrity of the film and as a barrier to the subsequently applied adhesive. It is preferred to apply the finish to the fiber surface after the reinforcing web has been formed. The finish can be applied by any conventional system such as dipping, spraying or padding.

Particularly useful materials for finishes in practicing this invention comprise emulsions of poly (siloxanes). Typical poly(siloxanes) can comprise aliphatic or aromatic moieties and often have repeating units containing 1 to about 20 carbon atoms. The molecular weight of the poly(siloxanes) may vary widely, but is generally at least about 1000. Often, the poly(siloxanes) have a molecular weight of about 1,000 to 300,000 when applied to the fibers of the reinforcing web. Common aliphatic and aromatic poly(siloxanes) include the poly(monosubstituted and disubstituted siloxanes), e.g., wherein the substituents are lower aliphatic, for instance, lower alkyl, including cycloalkyl, especially methyl, ethyl, and propyl, lower alkoxy; aryl including mono or bicyclic aryl including bis phenylene, naphthalene, etc.; lower mono and bicyclic aryloxy; acyl including lower aliphatic and lower aromatic acyl; and the like. The aliphatic and aromatic substituents may be substituted, e.g., with halogens, e.g., fluorine, chlorine and bromine, hydroxyl groups, lower alkyl groups, lower alkoxy groups, lower acyl groups and the like. The poly(siloxane) may be cross-linked and the poly(siloxane) may be a copolymer with a cross-linkable comonomer such as α-methylstyrene to assist in the cross-linking. Particularly advantageous poly(siloxanes) comprise poly(dimethylsiloxane), poly (phenylmethylsiloxane), poly(trifluoropropylmethylsiloxane), copolymers of α-methylstyrene and dimethylsiloxane.

A preferred finish is a dimethyl silicone emulsion with the active ingredient being an organopolysiloxane. Specific dimethyl silicone emulsions having an organopolysiloxane as the active ingredient are available from the Dow Corning Corporation under the designation "Dow Corning 75 emulsion" and "Dow Corning T4-0119". The amount of finish applied is based upon the pick-up of solids by the reinforcing web. The web is weighed dry, then an amount of finish is applied so as to cause the web to have a solids pick-up of broadly about 0.25 to 5.0%. A more preferred amount is a solids pick-up of about 1.0 to 4.0%.

After the finish is applied it is generally cured. Curing is time and temperature dependent and typically curing time decreases as the curing temperature increases. Curing of the finish is accomplished prior to impregnating the reinforcing web with adhesive.

It has been found that for dimethyl silicone finishes an acceptable curing cycle is a 30 to 60 second exposure at about 204° C. Curing time can be substantially reduced by incorporating a catalyst into the finish formulation. Suitable catalysts for curing silicone finishes include zinc octoate, iron octoate, dibutyl tin dilaurate and stannous octoate. Tin containing compounds have been found to be particularly good catalysts for curing silicone finishes used in this invention. The amount of catalyst used to facilitate curing of silicone finishes can broadly range from 1 part by weight of catalyst to 5 to 20 parts by weight of silicone emulsion to a more preferred amount of 1 part catalyst to 10 to 15 parts silicone finish.

The outer layers provide the laminate of this invention with softness and bulk. These layers further provide a substantial portion of the laminate thickness without imparting a high bulk density. These layers are generally about ½ to 10 times, preferably about ½ to 5 times and more preferably about 1 to 2 times the thickness of the reinforcing web. The fibers used in this layer may be natural fibers including cotton, linen, silk, wool or wood pulp, i.e., cellulosic, synthetic fibers including rayon, acetate, polyamide, polyester, acrylics, modacrylics or blends thereof.

A particular preferred embodiment of this invention uses short cellulosic fibers of wood pulp. These fibers provide an outer layer that is particularly soft to the touch while further providing a bulky and absorbent layer. These wood pulp fibers are used in the form of tissue layers of paper sheets. The sheets generally have a basis weight of from about 1.6 to about 65.5 g/m$^2$, preferably from about 10 to about 50 g/m$^2$ and more preferably from about 14.7 to about 32.7 g/m$^2$. The bulk density of tissue layers used in laminates of this invention is between about 0.03 and about 0.3 g/cc.

The adhesive employed in this invention may be any of a great variety known in the art. The selection of an adhesive is essentially dependent upon the nature of the fibers used in the outer layers. In addition, certain cohesive properties and properties of the laminate must be attained. It is well within the knowledge of those skilled in the art to prepare an adhesive formulation that will yield a laminate having the desired properties. The adhesive may be of the type dispersed in an aqueous or non-aqueous, i.e., organic liquid. The adhesive employed herein may be a homopolymer, copolymer or terpolymer or mixture thereof.

Those adhesives that are particularly useful in the instant invention are water-insoluble polymers commonly used in aqueous or organic dispersions including copolymers of butadiene with styrene, acrylonitrile or mixtures thereof; homo and copolymers of vinyl chloride and vinylidene chloride; homo and copolymers of acrylic esters including, esters of acrylic acid and alpha-substituted acrylic acids such as methyl, ethyl, propyl, isopropyl, isobutyl, amyl, octyl or 2-ethyl hexyl acrylate or methyl methacrylate, ethyl methacrylate, butyl methacrylate, lauryl methacrylate, methyl ethacrylate, benzyl acrylate, dimethyl itaconate and mixtures thereof; copolymers of acrylonitrile with any of those acrylic esters, styrene, vinyl chloride or a mixture thereof; polysulfides, polyamides; polyesters; polyesteramides; polyvinyl butyral; polyvinyl acetate; polyvinyl propionate; and mixtures thereof.

The amount of such water-insoluble polymers useful in this invention generally depends upon the particular polymer used, its particle size and the adhesive consistency. The weight of water-insoluble polymer solids in a dispersion for use in this invention is usually between about 30 and 50%.

Specific water-soluble polymers useful as adhesives include hydrolyzed polyvinyl acetate; polyvinyl alcohol; polyvinyl pyrrolidone; polyacrylic and polymethacrylic acids and salts thereof; polyacrylamide; polymethacrylamide; starch; dextrins; and sodium cellulose xanthate. The concentrations of such water-soluble polymers in solutions for use as an adhesive in this invention are normally between about 2% and 50%.

Preferred adhesive formulations useful in practicing this invention include water-insoluble polymers of acrylic esters dispersed in water. The concentration of such acrylic polymers is based upon the percent solids concentration and is generally from about 30 to about 50 percent. An acrylic polymer particularly suitable for use in this invention is available from the Union Carbide Company under the designation UCAR 872, a registered trademark of the Union Carbide Company.

The preferred adhesive formulations useful in practicing this invention can be applied by any conventional system such as dipping, spraying, pinch rolls or by printing with patterned or grooved rolls. The adhesive is applied in quantities sufficient to bond the outer layers to the reinforcing web without delamination when a laminate is stressed. The quantity of adhesive should also be controlled so that excess adhesive migration to the outer layers will be substantially minimized. The quantity applied depends upon the type of coverage, i.e., over-all coverage or pattern coverage. For over-all adhesive coverage broadly from about 17 to 51 g/m$^2$, and preferably from about 18 to about 45 g/m and more preferably from about 20 to about 41 g/m$^2$ of adhesive is applied based on the dry weight of the laminate. For a 30% pattern coverage of adhesive broadly from about 7 to 21 g/m$^2$ and preferably from about 7 to about 17 g/m$^2$ of adhesive is applied based on the dry weight of the laminate. The electrical conductivity of the tissue laminates of this invention can be increased by incorporating anti-static agents into the adhesive formulation. These agents effectively keep static potential at a low level.

After an open mesh reinforcing web has been treated with an appropriate finish it is impregnated with adhesive. The adhesive is substantially distributed throughout the web. The adhesive substantially surrounds the fibers and is prevented from contacting the fiber surfaces by the finish.

The adhesive impregnated reinforcing web is then combined with at least one layer of fibers on the upper surface and at least one layer of fibers on the lower surface. As herein discussed a preferred laminate of this invention employs tissue layers of paper sheets. Combining tissue layers of paper sheets with the adhesive impregnated web can be accomplished by any conventional mechanical means well known to those skilled in the art, for example, by passing the layers between a pair of nipped rubber covered rolls. Care should be exercised during formation of the laminate so as to preserve bulk and softness. Clearance at the roll nip and the amount of pressure exerted by the rolls on the laminate can effectively control the migration of adhesive from the reinforcing web into the tissue layers. Preventing adhesive migration maintains and preserves softness, drape and bulk.

After the laminate is formed by combining the outer fiber layers with the adhesive impregnated open mesh reinforcing web excess water is removed by drying. Depending upon the adhesive formulation curing may also be required. Drying and curing can be performed concurrently. To further enhance the aesthetics of the laminate of this invention a mechanical conditioning treatment may be performed after the laminate is formed. This treatment subjects the laminate to a mechanical compaction wherein any vestiges of bonding are disrupted and broken and also to eliminate any stiffness caused by inadvertent adhesive migration.

The broad, intermediate and preferred weight ranges for laminates of this invention, reinforcing webs, finish, outer fiber layers, and adhesive are set forth in the following tabulation:

|  | Broad g/m$^2$ | Intermediate g/m$^2$ | Preferred g/m$^2$ |
|---|---|---|---|
| Reinforcing Web | 3 to 150 | 6 to 34 | 10 to 25 |
| Finish | .0075 to 7.5 | .03 to 1.5 | .1 to 1.0 |
| Outer Fiber Layer | 1.6 to 65.5 | 10 to 50 | 14.7 to 32.7 |
| Adhesive | 17 to 51 | 18 to 45 | 20 to 41 |
| Laminate* | 23.2 to 339.5 | 44 to 180.5 | 59.5 to 132.4 |

*The laminate weights are calculated on the basis of two outer fiber layers present.

A particular preferred embodiment of this invention can further be explained by reference to the FIGURE which represents a tissue laminate 10 comprising an open mesh reinforcing web 12 having an adhesive 18 dispersed throughout, upper tissue layer 20 and lower tissue layer 26.

Reinforcing web 12 comprises randomly arranged fibers 14 generally of continuous length filaments. At points of fiber intersection 15 the fibers are lightly bonded to each other. Bond strength is quite low so that the bonds can easily be broken or disrupted by a mechanical treatment such as micro-creping after formation of the laminate. Thus the reinforcing web in laminate 10 has essentially no permanent inter-filamentary bonds thereby permitting fibers 14 to have freedom of movement within the web. Fibers 14 are provided with a finish 16 that essentially encircles the fiber surface forming an annular shell around them. This finish acts as a barrier to adhesive 18 and prevents the adhesive from contacting the surfaces of fibers 14.

Adhesive 18 is substantially distributed throughout the reinforcing web and in an amount sufficient to adhesively bond tissue layers 20 and 26 to the surfaces of the web but not in an excessive amount so that there would be a migration of adhesive into these tissue layers. The adhesive is located essentially within web 12 in order to achieve the desired aesthetic properties of softness, hand, and drape while at the same time achieving the desired high tear strength.

Upper tissue layer 20 has a soft exposed surface region 22 and an interior surface region 24 which is placed adjacent to the reinforcing web in contacting relationship. Lower tissue layer 26 has a soft exposed surface region 28 and an interior surface region 30 which is placed adjacent to the reinforcing web in contacting relationship. The thickness of these tissue layers is preferably from about 0.005 cm to about 0.0152 cm.

Tissue laminate 10 thus contains a reinforcing web 12 having essentially unbonded, randomly distributed fibers 14 with adhesive 18 surrounding the fibers. Adhesion between the fibers and adhesive is prevented by the presence of a finish 16 acting as a barrier between the fibers and the adhesive. The adhesive is effectively prevented from contacting the surfaces of the fibers and forming any type of adhesive bond therewith. Upper tissue layer 20 is joined to lower tissue layer 26 at the interface formed by the adhesively coated mating interior surface regions 24 and 30. Laminate 10 is essentially free of adhesive within the tissue layers and particularly on the surface regions 22 and 28.

Reinforcing fibers 14 are permitted freedom of movement within reinforcing web 12 due to the absence of permanent bonds. These fibers are also permitted to have freedom of movement within the tissue laminate because substantially no adhesion has occurred between adhesive 18 and fibers 14. Adhesion is essentially prevented by the presence of finish 16 applied to the fibers prior to impregnating the reinforcing web with adhesive.

The laminates of this invention exhibit very desirable properties. They are soft, drapable and absorbent. Tissue laminates using light weight reinforcing webs in the range from 7 to 17 g/m$^2$ having a tear strength of at least 400 grams, measured in both the transverse and machine directions are readily attainable. These properties were evaluated in the following manner:

EVALUATION OF PROPERTIES

The physical properties of the laminates of this invention were determined by the following procedure wherein ASTM is American Society for Testing Materials:

Tear strength is determined by the procedure set forth in ASTM D-1424-63, "Tear Resistance of Woven Fabrics by Falling-Pendulum (Elmendorf) Apparatus." In this method the average force required to continue a tongue-type tear in a fabric is determined by measuring the work done in tearing the fabric through a fixed distance. An average of ten determinations is made and the tearing force is reported in grams. It is well known in the art that tissue laminate tear strength is commonly referred to as the "Elmendorf Tear Strength." For purposes of this description the terms "tear strength" and "Elmendorf Tear Strength" are synonymous.

Laminate tensile strength and elongation are determined by the procedure set forth in ASTM D-1682-64, "Standard Test Methods for Breaking Load and Elongation of Textile Fabrics." In this method a continually increasing load is applied to the specimen, and the test is carried to rupture in a specific time. Values for the breaking load and elongation of the test specimen are obtained from machine scales or autographic recording charts. The method set forth in ASTM D-1682-64 has been modified slightly in order to accommodate 25.4 cm wide test specimens. Tensile strength is reported in kg/cm and elongation is expressed as the percentage increase in length, based upon the initial nominal gauge length of the specimen.

In order that the present invention may be readily understood the following examples are given by way of illustration but are not intended to be in any way a limit on the practice of the invention.

EXAMPLE 1

A series of tissue laminate samples approximately 29 cm × approximately 33 cm was prepared using different adhesives for the purpose of determining the affect of adhesive on laminate properties, particularly elongation and tear strength. One set of samples was elongated 27% prior to lamination in order to break any interfilamentary bonds in the reinforcing web in an attempt to increase elongation. The reinforcing web in one laminate sample was sprayed with a dimethyl silicone emulsion in order to determine the affect of such a treatment on laminate properties. Each laminate was prepared by mounting a lightly bonded open mesh reinforcing web of nylon 6,6 continuous filaments having a denier of 3 dpf in a tenter frame with moderate tension. The reinforcing webs were produced substantially in accordance with the method described in U.S. Pat. No. 3,542,615 wherein a web of continuous filaments was deposited on a moving conveyor belt, exposed to an activating gas and pressed to lightly bond the filaments at points of intersection. A sheet of wax paper was applied to the lower surface of the reinforcing web and the web was impregnated with adhesive using a number 40 wire-wound doctor rod so that all fibers were substantially surrounded with adhesive. The dry adhesive pick-up on the reinforcing web was approximately 33.9 g/m$^2$. The wax paper was removed and the web was then air dried to remove water. Tissue layers 0.0114 cm thick and having a basis weight of approximately 23 g/m$^2$ and a bulk density about 0.227 g/cc were applied to the upper and lower surface regions of the web and combined into a laminate by running a roll over the layers. The laminate was removed from the tenter frame and cured at 177° C. for five minutes in a Noble and Wood paper drier. The results of tests performed in accordance with the procedures herein described on the tissue laminates from this example are set forth below in Table I.

TABLE I

| | TISSUE LAMINATE STRENGTH PROPERTIES | | | | | | |
|---|---|---|---|---|---|---|---|
| Sample Identification | Reinforcing Web Basis Wt. g/m$^2$ | Finish | Adhesive | Tensile Strength kg/cm[e] | Elong. %[f] | Tear Strength grams | |
| | | | | | | MD[d] | TD[e] |
| 639-1 | 10.2 | None | UCAR 872 | .57 | 10 | 320 | 160 |
| -2 | 10.2 | None | UCAR 872 | .55 | 9 | 220 | 217 |
| -3 | 10.2 | None | UCAR 872 | .64 | 11 | 387 | 167 |
| -4 | 13.6 | None | UCAR 872 | .89 | 13 | 378 | 195 |
| -5 | 13.6 | None | UCAR 872 | .93 | 15 | 470 | 304 |
| -6 | 13.6 | None | UCAR 872 | .95 | 15 | 320 | 175 |
| 640-1 | 10.2 | None | UCAR 803 | .55 | 12 | 363 | 180 |
| -2 | 10.2 | None | UCAR 3487 | .59 | 10 | 313 | 212 |
| -3 | 10.2 | None | UCAR 874 | .59 | 13 | 327 | 167 |
| 641-1[a] | 10.2 | None | UCAR 872 | .61 | 11 | 260 | 193 |
| -2[a] | 13.6 | None | UCAR 872 | .79 | 17 | 316 | 157 |
| 642-1 | 13.6 | Silicone[c] | UCAR 872 | .64 | 24 | 1180 | 967 |

TABLE I-continued
TISSUE LAMINATE STRENGTH PROPERTIES

| Sample Identification | Reinforcing Web Basis Wt. g/m² | Finish | Adhesive | Tensile Strength kg/cm[e] | Elong. %[f] | Tear Strength grams MD[d] | Tear Strength grams TD[e] |
|---|---|---|---|---|---|---|---|
| -2 | 13.6 | Emulsion None | Rubber Cement | .61 | 21 | 600 | 377 |
| -3 | 13.6 | None | Ethylene & Acrylic Acid Copolymer | 1.55 | 6 | 175 | 100 |

[a]These samples were stretched 27% prior to lamination
[b]UCAR 872; UCAR 803; UCAR 3487; UCAR 874 - Acrylic resin polymer adhesives available from Union Carbide Co.
[c]Finish Dow Corning 75 emulsion - available from the Dow Corning Corp.
[d]Tissue laminate strength measured in machine direction.
[e]Tissue laminate strength measured in transverse direction.
[f]Elongation % based on tissue rupture.

The results of the tests of Example I show that using different adhesives has little effect on elongation and tear strength of tissue laminates. The two laminates that contained prestretched reinforcing webs likewise did not show any improvement in elongation. The sample illustrative of the invention containing the dimethyl silicone finish treated reinforcing web had the highest elongation and a significantly higher tear strength than any of the other sample laminates. These test results clearly illustrate the improved properties of the tissue laminate of this invention.

EXAMPLE II

A series of tissue laminate samples approximately 29 cm × approximately 33 cm was prepared by first mounting lightly bonded open mesh reinforcing webs of nylon 6,6 continuous filaments in a tenter frame with moderate tension. All of the webs were treated with a silicone emulsion prior to adhesive impregnation. The webs were impregnated with an acrylic polymer adhesive and combined into laminates in the manner described in Example I. The purpose of this Example is to determine the amount of a curing catalyst that should be added to a silicone emulsion in order to attain a consistent level of high tear strength. One set of samples did not contain a catalyst in the silicone emulsion. The other sets of samples contained different finish; catalyst ratios wherein different parts of finish were added to one part of catalyst, the parts being on a weight basis. The catalyst used in this Example is identified as "catalyst 62" in Dow Corning Corporation Bulletin 22-227a dated April 1973. The catalyst is described as a containing tin compound. The tear strengths obtained by testing these samples are set forth in Table II.

TABLE II
TISSUE LAMINATE TEAR STRENGTH

| Sample Identification | Finish Catalyst Ratio | Amount of Finish, % (b) | Laminate Basis Weight, g/m² | Tear Strength grams MD | Tear Strength grams TD |
|---|---|---|---|---|---|
| 645-1 | 0 | 1.3 | (a) | 450 | 400 |
| 645-2 | 0 | 2.6 | (a) | 380 | 320 |
| 645-3 | 0 | 3.9 | (a) | 460 | 370 |
| Average | | | | 430 | 363 |
| 645-4 | 20:1 | 0.75 | (a) | 600 | 270 |
| 645-5 | 20:1 | 1.3 | (a) | 470 | 350 |
| 645-6 | 20:1 | 2.6 | (a) | 600 | 450 |
| 645-7 | 20:1 | 3.6 | (a) | 680 | 620 |
| 645-8 | 20:1 | 3.9 | (a) | 980 | 620 |
| A | 20:1 | 3.9 | 98.3 | 755 | 440 |
| Average | | | | 680 | 508 |
| 645-9 | 15:1 | 1.3 | (a) | 1060 | 620 |
| 645-10 | 15:1 | 2.6 | (a) | 820 | 500 |
| 645-11 | 15:1 | 3.9 | (a) | 640 | 460 |
| B | 15:1 | 3.9 | 108.5 | 960 | 675 |
| Average | | | | 870 | 564 |
| 645-12 | 10:1 | 1.3 | (a) | 690 | 340 |
| 645-13 | 10:1 | 2.6 | (a) | 800 | 590 |
| 645-14 | 10:1 | 3.9 | (a) | 930 | 560 |
| C | 10:1 | 3.9 | 91.5 | 985 | 605 |
| Average | | | | 851 | 524 |
| 645-15 | 5:1 | 1.3 | (a) | 540 | 310 |
| 645-16 | 5:1 | 2.6 | (a) | 520 | 410 |
| 645-17 | 5:1 | 3.9 | (a) | 680 | 440 |
| D | 5:1 | 3.9 | 88.1 | 730 | 565 |
| Average | | | | | 618 | 431 | a. The laminate basis weight is approximately 81.4 to 94.9 g/m².
b. Finish, Dow Corning 75 emulsion, available from the Dow Corning Corp.

This example shows that a catalyst can be used to consistently obtain a tear strength level in both the machine and transverse directions of the laminate above 400 grams. The optimum finish: catalyst ratio required to consistently obtain the highest tear strength level is shown to be about 10 to 15:1.

EXAMPLE III

Two groups of tissue laminate samples approximately 29 cm × approximately 33 cm were prepared using reinforcing webs substantially as described in Example I. The webs were impregnated with an acrylic polymer adhesive and combined into laminates in the manner described in Example I. In one group of samples the reinforcing webs were treated with a dimethyl silicone emulsion having a catalyst substantially as described in Example II prior to adhesive impregnation. The ratio of finish:catalyst was 15:1. The amount of finish was about 5% of the dry weight of the reinforcing web. The reinforcing webs and laminates containing these webs were each tested in accordance with methods herein described. The results of these tests are set forth below in Table III. In the second group of samples the reinforcing webs were not treated with a finish prior to adhesive impregnation. The reinforcing webs and laminates containing these webs were each tested in accordance with methods herein described. The results of these tests are also set forth below in Table III.

TABLE III

PROPERTIES OF TREATED AND UNTREATED REINFORCING WEBS AND TISSUE LAMINATES CONTAINING THESE WEBS

|  |  | Reinforcing Web Properties | | | | Tissue Laminate Properties | | | |
| --- | --- | --- | --- | --- | --- | --- | --- | --- | --- |
|  |  | Untreated Web | | Treated Web | | Untreated Web | | Treated Web | |
| Basis Weight, g/m² |  | 9.12 | 13.56 | 10.85 | 12.54 | 91.53 | 98.31 | 88.14 | 98.31 |
| Thickness, cm |  | 0.0071 | 0.0071 | 0.0074 | 0.0076 | ND | ND | ND | ND |
| Tear Strength, grams | MD | 685 | 715 | 680 | 560 | 390 | 320 | 660 | 725 |
|  | TD | 955 | 1015 | 805 | 770 | 170 | 180 | 420 | 555 |
| Tensile Strength, kg/cm | MD | 0.57 | 1.00 | 0.55 | 0.91 | ND | ND | ND | ND |
|  | TD | 0.16 | 0.29 | 0.11 | 0.14 | 0.64 | 0.95 | 0.64 | 0.70 |

ND = Not Determined

This table clearly shows the higher tear strength level for tissue laminates of this invention. The tear strength of the laminates containing the reinforcing webs treated with a silicone finish is about double the tear strength of the laminates containing the untreated reinforcing webs.

EXAMPLE IV

A series of tissue laminate samples was prepared substantially in the manner described in Example I. The purpose of this Example is to determine the effectiveness of different finishes which are applied to the fibers of the reinforcing web prior to adhesive impregnation insofar as tear strength is concerned. The results of tests performed on these samples are set forth below in Table IV.

TABLE IV

Effect of Different Finishes Applied to the Fibers of Reinforcing Webs on Laminate Tear Strength,

|  | Description of Finish Used | Tear Strength, grams | |
| --- | --- | --- | --- |
|  |  | MD | TD |
| 1. | Polyolefin Emulsion | 340 | 200 |
| 2. | Polyoxyethylene Glyceride Ester | 245 | 145 |
| 3. | Dimethyl Polysiloxane | 1015 | 705 |
| 4. | Dimethyl Polysiloxane | 830 | 530 |

These data show that the tissue laminates containing reinforcing webs treated with a dimethyl silicone finish exhibited exceptionally higher tear strengths. The other samples that contained webs treated with other organic finishes had much lower tear strengths.

EXAMPLE V

Five tissue laminate samples identified as A through E were prepared in substantially the same manner as the laminates described in Example I. The purpose of this Example is to evaluate the effectiveness of different levels of dimethyl silicone finish on heavier basis weight (16.95 g/m²) reinforcing webs. One tissue laminate, Sample A did not contain a reinforcing web treated in the manner of this invention. The silicone finish contained a curing catalyst in a 15:1 finish to catalyst ratio. The results of tests performed on these tissue laminates are set forth below in Table V.

TABLE V

Tissue Laminate Properties Using Various Amounts of Finish on Heavier Basis Weight Reinforcing Web

| Sample |  | A | B | C | D | E |
| --- | --- | --- | --- | --- | --- | --- |
| Amount of Finish, % |  | 0 | 0.65 | 1.3 | 2.6 | 3.9 |
| Tissue Laminate Basis Wt., g/m² |  | 94.9 | 94.9 | 94.9 | 91.5 | 91.5 |
| Tear Strength, grams | MD | 260 | 520 | 455 | 555 | 465 |
|  | TD | 180 | 445 | 430 | 415 | 380 |
| Tensile Strength, kg/cm | TD | 1.11 | .86 | .95 | .84 | .80 |

This table clearly shows the higher tear strength level of tissue laminates containing reinforcing webs treated in the manner of this invention.

Laminates of this invention, as described in the aforementioned Examples, were handled after formation and they were characterized by softness and drape.

Another feature of the laminates of this invention is its air permeability. This feature relates to moisture vapor transmission. When laminates of this invention are formed into surgical garments these garments should allow moisture to be transmitted. This provides one wearing such a garment to be comfortable and maintain a uniform body temperature. Sufficient air permeability is achieved by insuring that the adhesive is not too densely packed within the reinforcing web. As herein discussed sufficient adhesive is impregnated into the web to essentially surround the fibers and prevent delamination. Care should be exercised during assembly of the laminate so as not to retard the air permeability of the laminate.

Various modifications of the invention in addition to those shown and described herein will become apparent to those skilled in the art from the foregoing description. Such modification are intended to fall within the scope of the appended claims.

We claim:

1. A flexible laminate, comprising: a reinforcing web said web having upper and lower surfaces and comprising essentially all lightly bonded fibers said fibers being coated with a finish; an adhesive distributed essentially throughout said web and surrounding the fibers comprising said web, said adhesive being prevented from contacting said fibers by said finish; and, at least one outer layer of fibers adhesively bonded to at least one surface of said web.

2. The laminate of claim 1 wherein said web comprises a nonwoven web of organic continuous filaments having a basis weight from about 3 to about 150 g/m².

3. The laminate of claim 2 wherein said nonwoven web is spun bonded.

4. The laminate of claim 2 wherein said filaments are polyamides.

5. The laminate of claim 1 wherein said finish covers said reinforcing fibers with an essentially complete and impervious annular shell.

6. The laminate of claim 1 wherein said finish is applied in an amount ranging from a solids pick-up of about 0.25 to about 5.0% based upon the weight of said web.

7. The laminate of claim 1 wherein said finish is applied in an amount ranging from a solids pick-up of from about 1.0 to about 4.0% based upon the weight of said web.

8. The laminate of claim 1 wherein said finish is an emulsion of a silicone polymer.

9. The laminate of claim 8 wherein said silicone polymer is a dimethyl silicone.

10. The laminate of claim 8 wherein said finish contains a curing catalyst.

11. The laminate of claim 10 wherein said curing catalyst contains a tin compound.

12. The laminate of claim 11 wherein said curing catalyst is present in an amount from about 1 part by weight catalyst to about 5 to 20 parts by weight silicone polymer.

13. The laminate of claim 1 wherein said adhesive is an acrylic polymer dispersion having a solids concentration from about 30 to about 50%.

14. The laminate of claim 13 wherein the amount of said adhesive is present in an amount from about 7 to about 51 g/m².

15. The laminate of claim 1 wherein at least one outer layer of fibers is applied to both the upper and lower surfaces of said web and is adhesively bonded to said surfaces.

16. The laminate of claim 15 wherein said outer layers comprise cellulosic fibers having a bulk density between about 0.03 and about 0.3 g/cc.

17. The laminate of claim 16 wherein said outer layers are tissue paper having a basis weight of from about 1.6 to about 65.5 g/m².

18. A flexible tissue laminate, characterized by having a tear strength in both the transverse and machine directions of at least 400 grams, said laminate comprising: a nonwoven reinforcing web having upper and lower surfaces and comprising essentially all lightly bonded fibers said fibers being coated with a finish and said web weighing from about 6 to about 34 g/m²; an adhesive distributed essentially throughout said web, said adhesive being prevented from contacting said fibers by said finish; at least one tissue layer adhesively bonded to the upper surface of said web; and, at least one tissue layer adhesively bonded to the lower surface of said web.

19. The tissue laminate at claim 18 wherein said nonwoven web comprises spun bonded continuous polyamide filaments.

20. The tissue laminate of claim 18 wherein said finish is an emulsion of a silicone polymer present in an amount ranging from a solids pick-up of from about 0.25 to about 5.0% based upon the weight of said web.

21. The tissue laminate of claim 20 wherein said finish further comprises a dimethyl silicone having a curing catalyst wherein the ratio of said finish to catalyst is from about 1 part by weight catalyst to about 5 to 20 parts by weight silicone polymer.

22. The tissue laminate of claim 18 wherein said adhesive is an acrylic polymer dispersion having a solids concentration from about 30 to 50% and present in an amount from about 7 to about 51 g/m².

23. The tissue laminate of claim 18 wherein said tissue layers have a basis weight of from about 14.7 to about 32.7 g/m² and a bulk density between about 0.03 and about 0.3 g/cc.

24. A process for producing a flexible laminate, comprising the steps of: providing a reinforcing web having upper and lower surfaces comprising essentially all lightly bonded fibers having a basis weight of from about 3 to about 150 g/m²; applying a finish to said fibers; impregnating said web with an adhesive, whereby said adhesive is prevented from contacting said fibers by said finish; and applying at least one outer layer of fibers to at least one surface of said web and adhesively bonding said layer to said web surface.

25. The process of claim 24 wherein said reinforcing web comprises a nonwoven web of organic continuous filaments.

26. The process of claim 25 wherein nonwoven web is spun bonded and having a basis weight from about 6 to about 34 g/m².

27. The process of claim 24 wherein said finish covers said reinforcing fibers with an essentially complete and impervious annular shell.

28. The process of claim 24 wherein said finish is an emulsion of a silicone polymer.

29. The process of claim 28 wherein said silicone emulsion is a dimethyl silicone.

30. The process of claim 29 wherein said dimethyl silicone contains a catalyst for curing.

31. The process of claim 24 further comprising the step of curing said finish before said web is impregnated with adhesive.

32. The process of claim 30 wherein said finish is applied in an amount ranging from a solids pick-up of about 0.25 to about 5.0% based upon the weight of said reinforcing web.

33. The process of claim 32 wherein said finish is applied in an amount ranging from a solids pick-up of about 1.0 to about 4.0% based upon the weight of said reinforcing web.

34. The process of claim 24 wherein said adhesive is an acrylic polymer dispersion having a solids concentration from about 30 to about 50%.

35. The process of claim 34 wherein the amount of said adhesive is from about 17 to about 51 g/m².

36. The process of claim 24 further comprising applying at least one outer layer of fibers to both the upper and lower surfaces of said web and adhesively bonding said layers to said web surfaces.

* * * * *